Patented Dec. 12, 1933

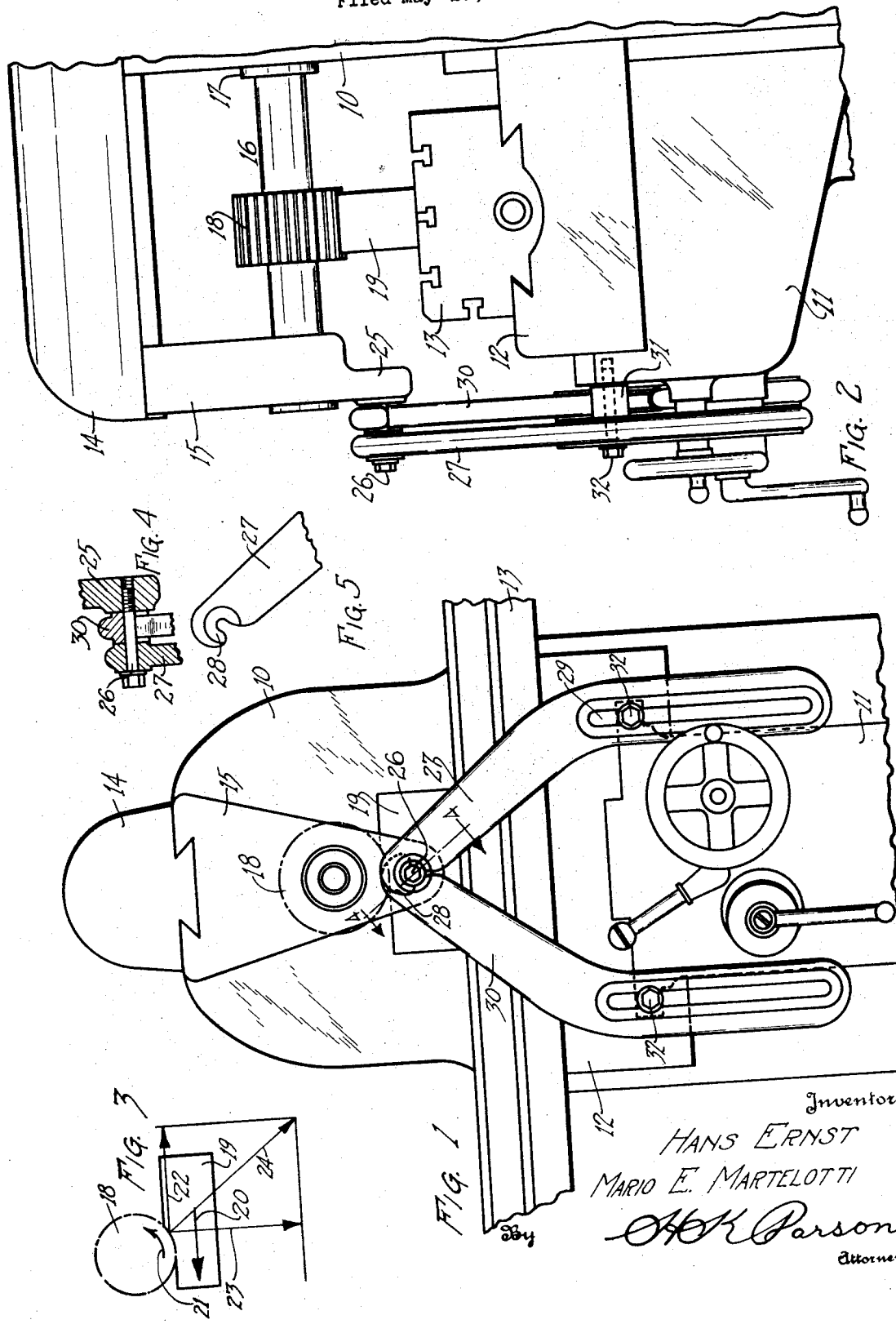

1,938,774

UNITED STATES PATENT OFFICE 1,938,774

MILLING MACHINE

Hans Ernst and Mario E. Martelotti, Cincinnati, Ohio, assignors to The Cincinnati Milling Machine Company, Cincinnati, Ohio, a corporation of Ohio Application May 27, 1930. Serial No. 456,209

3 Claims. (Cl. 90—18)

This invention relates to milling machines and more particularly to improvements in the structural organization thereof.

One of the principal objects of this invention is to provide improved bracing means for anchoring the cutter supporting structure of a milling machine with respect to the work support to reduce vibration of the working parts and thereby prevent chattering of the cutter.

Another object of this invention is the provision in a knee and column type milling machine having a projecting cutter support and a projecting work support of improved means for bracing the free ends thereof to prevent lateral oscillatory movement of one with respect to the other.

A further object of this invention is the provision of outboard brace members for the cutter supporting structure of a milling machine that are adapted to be separately or individually attached at one end to a single clamping member on the structure to facilitate quick assembly or removal and wherein the clamping member also acts to support the braces during clamping of the opposite ends thereof.

A still further object of this invention is the provision of a brace for staying the arbor support of a milling machine with respect to the knee in such a manner that the knee may be adjusted without disturbing the clamping means between the brace and arbor support.

Other objects and advantages of the present invention should be readily apparent by reference to the following specification considered in conjunction with the accompanying drawing illustrative of one embodiment thereof but it will be understood that any modifications may be made within the specific structural details hereinafter disclosed within the scope of the appended claims without departing from or exceeding the spirit of the invention.

Referring to the drawing in which like reference numerals indicate like parts:

Figure 1 is a front elevation of a milling machine embodying the principles of this invention.

Figure 2 is a side elevation of a milling machine.

Figure 3 is a diagram showing the general relationship of the forces acting at the point of contact between the cutter and work under average working conditions.

Figure 4 is a detail section on the line 4—4 of Figure 1.

Figure 5 is a detail of the hooked end of the brace.

The reference numeral 10 indicates the column of a milling machine having vertically slidable thereon the knee 11 which supports the saddle 12 for movement toward and from the column and the table 13 mounted on the saddle for reciprocating movement transversely thereof. An overarm 14 is adjustably mounted on the top of the column and carries an arbor support or pendant 15 for journaling the outboard end of the cutter arbor 16 fixed in the spindle 17 journaled in the column for rotating the cutter 18 carried by the arbor. The foregoing structure constitutes the well known elements of a knee and column type milling machine and forms no part of the present invention.

In such machines it is well recognized that under certain cutting conditions if the work support and cutter support are not properly anchored with respect to one another that considerable chatter takes place between the cutter and work with the result that the machined surface of a work piece which has passed through the machine is left in a rather rough condition due to chatter marks thereon.

To better illustrate the forces at work tending to cause relative movement and consequent vibration of the working parts and thereby chatter of the cutter, reference may be had to Figure 3, wherein a work piece, such as 19, is represented as being fed in the direction of the arrow 20 against the action of a cutter such as 18 rotating in the direction of the arrow 21. From the diagram it will be seen that the pressure of the work against the cutter tends to cause bodily movement of the cutter in two directions which must be counteracted by the cutter supporting structure. For instance, the horizontal component of the work pressure tends to cause pivotal movement of the cutter arbor about the center of mass of the overarm, which acts as the pivot point as well as tending to cause lateral movement of the overarm about the point of its intersection with the column as a pivot while the vertical component of the work pressure tends to cause upward movement of the cutter arbor and bending of the overarm at its point of intersection with the column. The forces which must be exerted in order to overcome the components of the work pressure are shown by the horizontal vector 22 representing the resisting force necessary to neutralize the horizontal component of the work pressure and the vertical vector 23 representing the resisting force necessary to neutralize the vertical component of the work pressure. Completing the force diagram it will be seen that the vector 24 represents the resultant reaction necessary to balance the resultant of the work pressure. Therefore, it is apparent that in order to efficiently brace the cutter supporting structure that a brace member should extend in a plane substantially parallel with the line of the resultant reaction and attached to the arbor support at a point greatly remote from the center of mass of the overarm.

In conformity with this theory and approximating the design as near as possible thereto considering variation of cutter sizes, the pendant 15 is provided with a depending portion 25 for receiving a brace supporting and clamping member such as the bolt 26. It will be noted that the axis of this bolt is substantially in line with the intersection of the forces acting at the point of contact between the cutter and work. If a brace member extends from this point in a plane parallel with the vector line 24 it will be seen that it extends in a line parallel with the resultant force and thereby with one brace will neutralize all of the forces caused by the work pressure and will prevent relative vibration between the cutter and work. To this end a brace member 27 has been provided which extends in substantially the suggested direction and has a hooked end 28 for engagement with the bolt 26, and a slot 29 at the other end, extending vertically when the brace is mounted on the machine, for attachment to the knee in any of its vertically adjusted positions. To resist the forces that act when the work feed is in the opposite direction and the cutter rotating in the opposite direction, a second brace member 30 is provided which is similar in construction to the previous brace member just described. Thus a triangular brace structure has been provided in which the knee forms one side thereof, and the braces 27 and 30 form the other two sides. The vertex of the triangle opposite to the knee side is attached to the cutter support at a point substantially in line with the intersection of the distortional forces whereby the braces may act as tension members to directly neutralize these forces.

To insure that the braces will not interfere with one another when they are mounted on the machine, a spacing block 31 is provided for one of the members at the point of its attachment to the knee thus permitting the braces to overlap when mounted on the bolt 26. Means have been provided for securing the braces to the knee in the form of bolts 32 which pass through the slots 29 of the brace members and are threaded into the knee.

In prior structures it has been somewhat the practice to provide the ends of braces which are to be attached to the cutter supporting structure with holes or slots for receiving a clamping bolt by which they are secured in place. With such construction the brace members, usually two in number, must be supported in overlapping relation and in registry with a threaded hole in order that the clamping bolt may be put into place. This is a somewhat difficult operation due to the weight of the brace members and it is one of the objects of this invention to overcome such awkward assembly operations by providing the ends of the brace members with hooked ends whereby one brace may be mounted on a pre-inserted bolt and supported thereby while the other end is secured in place, thus making it possible to mount the braces separately and in an easy and quick manner without great physical exertion on the part of the operator.

The braces may also be separately hung on the bolt with their free ends dangling after which each may be individually swung into position and clamped to the knee. The bolt 26 may then be tightened to secure the braces to the pendant. If it is now desired to adjust the knee vertically, it is only necessary to loosen the bolts 32 whereupon the knee may be adjusted without disturbing the clamping bolt 26.

This construction also makes it possible to quickly move the braces out of the way when clamping cutter gangs by simply loosening the bolts 26 and 32 and lifting the arms slightly to disengage the bolt 26, after which they may be folded over alongside of one another or swung about the bolts 32 and allowed to hang down.

Attention is also invited to the fact that due to the form of the braces the operator has substantially a clear view of the action of the cutter on the work which will be observed by noting the relative position of the parts, as shown in Figure 1. It is there apparent that irrespective of the direction of movement of the work with respect to the cutter that the cutter action may be observed without interference of projecting parts.

From the description it will now be perceived that a brace structure has been provided for the cutter supporting means wherein the members thereof are placed in the most efficient positions to counteract the distortional forces caused by the pressure of the work against the cutter thereby preventing undue movement and vibration of the working parts and relieving distortional stresses in the cutter supporting structure. Also the brace members are adapted to be easily and quickly mounted or de-mounted from the machine to the end that a very efficient structure has been provided comprising a few parts of simple construction.

That which is claimed is:

1. A brace for a milling machine, said machine having a column, a cutter supporting structure and a work supporting structure projecting in parallel relation from the column, said cutter supporting structure including an over-arm attached to the column, an arbor support depending from the over-arm and a clamping member projecting from the arbor support below the axis of the arbor, comprising an angular shaped member forming diverging legs, one leg having a downwardly opening slot formed in the end thereof for detachable engagement with the clamping member on the arbor support, the other leg having an elongated slot formed longitudinally thereof for receiving a clamping member carried by the work support, said slot extending vertically upon assembly of the brace with the machine whereby the work support may be adjusted relative to the cutter support without removal of the clamping means.

2. An overarm brace for a milling machine comprising an elongated member curved longitudinally thereof to form two leg portions, one of said leg portions having a hook shaped end forming a downwardly opening slot for quick attachment or detachment relative to the shank of a headed clamping member, said other leg portion having an elongated slot formed longitudinally thereof to receive a clamping member, said slot permitting relative adjustment between the leg portion and the clamping member upon assembly with the machine.

3. In a milling machine having a column, a cutter arbor journaled therein, an overarm carried by the column, an arbor support depending from the overarm for journaling and supporting the outboard end of said arbor, a clamping member projecting from the arbor support below the axis of the arbor, a work support projecting from the column parallel to the cutter arbor, the combination of means for bracing the arbor support against relative movement with respect to the work support including a pair of elongated brace members, said members being bent longitudinally thereof to form leg portions, one end of each member being hook shaped to form downwardly projecting openings whereby the brace members may be quickly detachably assembled to the clamping member while the same is mounted in the arbor support, said members adapted to overlie one another upon assembly with the member for simultaneous clamping thereby, the adjacent leg portions extending substantially in the direction of the resultant of the cutting force whereby one of said portions will act as a tension member and the other as a compression member, the remaining leg portions having an elongated slot formed longitudinally thereof, said last named leg portions extending parallel to the direction of work support adjustment relative to the cutter, and means projecting through each slot for clamping the braces to the work support, said slots permitting relative adjustment between the work support and the braces without removal of the clamping means.

HANS ERNST.
MARIO E. MARTELOTTI.